United States Patent
Jo

(10) Patent No.: US 10,620,068 B2
(45) Date of Patent: Apr. 14, 2020

(54) APPARATUS AND METHOD FOR DETECTING STEERING INFORMATION

(71) Applicant: MANDO CORPORATION, Gyeonggi-do (KR)

(72) Inventor: Sang Uk Jo, Incheon (KR)

(73) Assignee: MANDO CORPORATION, Gyeonggi-Do (KR)

( * ) Notice: Subject to any disclaimer, the term of this patent is extended or adjusted under 35 U.S.C. 154(b) by 8 days.

(21) Appl. No.: 15/980,741

(22) Filed: May 16, 2018

(65) Prior Publication Data

US 2018/0335357 A1 Nov. 22, 2018

(30) Foreign Application Priority Data

May 22, 2017 (KR) .......................... 10-2017-0062763

(51) Int. Cl.
| | |
|---|---|
| *G01L 5/22* | (2006.01) |
| *B62D 15/02* | (2006.01) |
| *B62D 5/04* | (2006.01) |
| *B62D 6/10* | (2006.01) |

(52) U.S. Cl.
CPC .............. *G01L 5/221* (2013.01); *B62D 5/049* (2013.01); *B62D 6/10* (2013.01); *B62D 15/0245* (2013.01)

(58) Field of Classification Search
CPC ...... B62D 5/049; B62D 15/0245; B62D 6/10; G01L 5/221
USPC .......................................................... 701/41
See application file for complete search history.

(56) References Cited

U.S. PATENT DOCUMENTS

| | | | | |
|---|---|---|---|---|
| 5,811,695 A | * | 9/1998 | Satoh ...................... | G01L 3/105 73/862.331 |
| 6,386,052 B1 | * | 5/2002 | Satoh ..................... | B62D 5/049 73/1.09 |
| 6,653,829 B1 | * | 11/2003 | Henry .................. | G01D 5/2451 324/207.21 |
| 10,046,801 B2 | * | 8/2018 | Niki ..................... | B62D 15/025 |
| 2007/0169986 A1 | * | 7/2007 | Choi ..................... | B62D 15/02 180/444 |

(Continued)

FOREIGN PATENT DOCUMENTS

| | | |
|---|---|---|
| KR | 10-2007-0049472 | 5/2007 |
| KR | 10-2014-0101097 | 8/2014 |
| KR | 10-2016-0044552 | 4/2016 |

OTHER PUBLICATIONS

Office Action dated Sep. 6, 2018 for Korean Patent Application No. 10-2017-0062763 and its English machine translation by Google Translate.

*Primary Examiner* — Atul Trivedi
(74) *Attorney, Agent, or Firm* — Ladas & Parry, LLP

(57) ABSTRACT

Provided is an apparatus and method for detecting steering information in which a plurality of torque sensors and sensors for sensing a rotation angle of a steering shaft are provided and thus it is possible to calculate steering information, such as a steering torque, a steering angle, etc., even upon occurrence of failure in some sensors. A plurality of torque sensors and absolute angle sensors (rotation angle sensors) are provided, and after it is determined whether an output value of each sensor is synchronized, a torque and a steering angle are calculated accordingly. Therefore, even upon occurrence of failure in some sensors, it is possible to calculate a torque and a steering angle normally, and thus steering control is possible.

17 Claims, 9 Drawing Sheets

(56) References Cited

U.S. PATENT DOCUMENTS

| | | | |
|---|---|---|---|
| 2007/0278032 A1* | 12/2007 | Sakaguchi | B62D 5/0481 180/446 |
| 2008/0035411 A1* | 2/2008 | Yamashita | B62D 5/046 180/443 |
| 2009/0100972 A1* | 4/2009 | Hoenke | B62D 17/00 81/57.22 |
| 2012/0031202 A1* | 2/2012 | Goto | B62D 5/049 73/862.193 |
| 2012/0185132 A1* | 7/2012 | Kezobo | B62D 5/0472 701/41 |
| 2012/0271513 A1* | 10/2012 | Yoneda | B62D 5/0484 701/41 |
| 2015/0051794 A1* | 2/2015 | Wei | B62D 5/0493 701/41 |
| 2015/0239492 A1* | 8/2015 | Yukitake | B62D 5/003 701/43 |
| 2016/0001815 A1* | 1/2016 | Sasaki | B62D 5/0481 701/43 |
| 2016/0144404 A1* | 5/2016 | Houston | B06B 1/166 318/114 |
| 2016/0167701 A1* | 6/2016 | Sone | B62D 5/0463 701/43 |
| 2016/0339946 A1* | 11/2016 | Kuramitsu | B62D 5/0421 |
| 2016/0339948 A1* | 11/2016 | Nakamura | B62D 1/04 |
| 2016/0355211 A1* | 12/2016 | Suzuki | B62D 5/0457 |
| 2017/0274929 A1* | 9/2017 | Sasaki | B62D 5/04 |
| 2018/0194390 A1* | 7/2018 | Goto | B62D 6/00 |
| 2018/0244307 A1* | 8/2018 | Tsubaki | B62D 5/0472 |
| 2019/0054952 A1* | 2/2019 | Sasaki | B62D 6/00 |
| 2019/0263446 A1* | 8/2019 | Tsubaki | B62D 1/286 |
| 2019/0367076 A1* | 12/2019 | Kim | B62D 5/0406 |

* cited by examiner

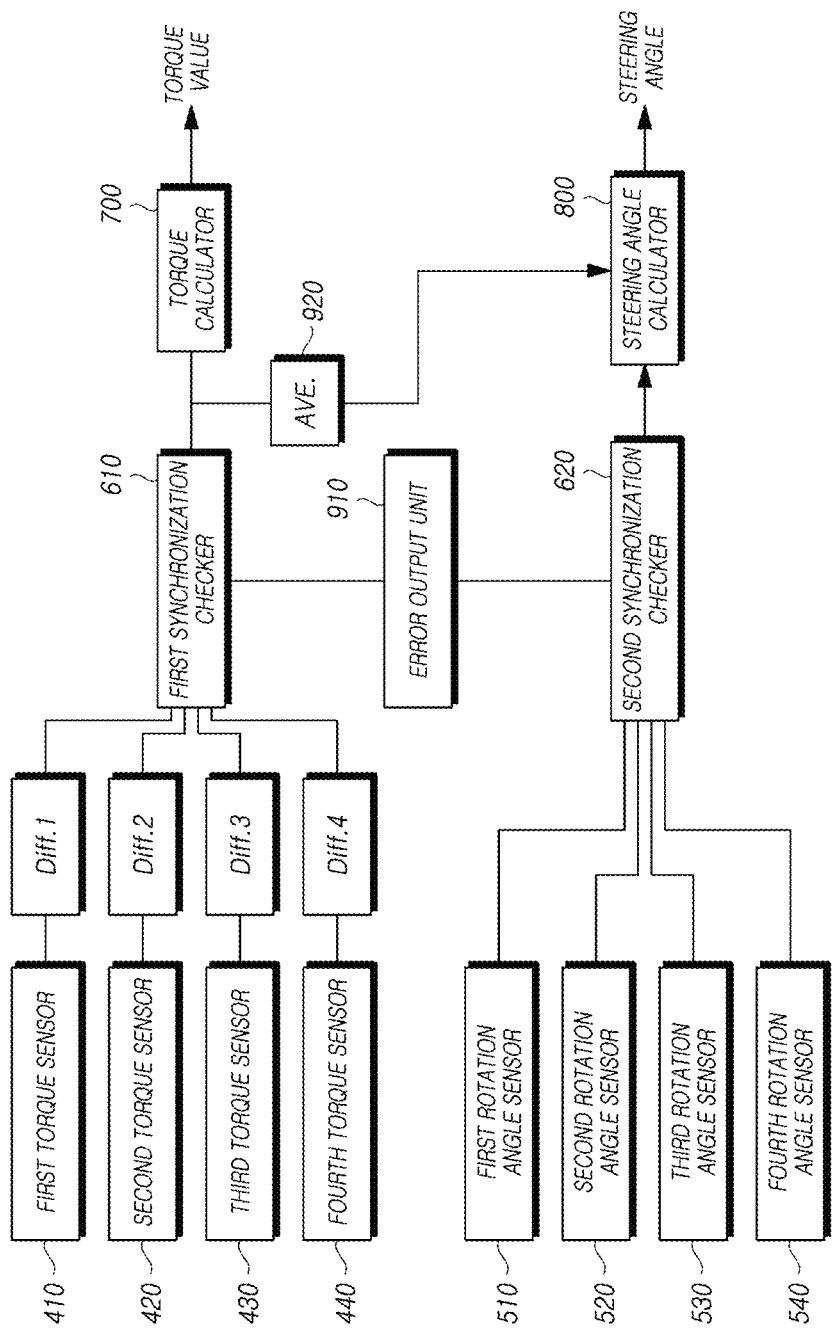

APPARATUS AND METHOD FOR DETECTING STEERING INFORMATION

CROSS REFERENCE TO RELATED APPLICATION

This application claims priority from Korean Patent Application No. 10-2017-0062763, filed on May 22, 2017, which is hereby incorporated by reference for all purposes as if fully set forth herein.

BACKGROUND OF THE INVENTION

1. Field of the Invention

The present disclosure relates to an apparatus and method for detecting steering information, and more particularly, to an apparatus and method in which a plurality of torque sensors and sensors for sensing a rotation angle of a steering shaft are provided to calculate steering information, such as a steering torque, a steering angle, etc., even upon occurrence of failure in some sensors.

2. Description of the Prior Art

In general, a power steering system is applied to a vehicle as a means for ensuring the stability of steering by reducing a force required to move a steering wheel. As a power steering system, a hydraulic power steering (HPS) system was widely used in vehicles in the past, but an electric power steering (EPS) system, which is environment-friendly and assists a driver in steering by using a turning force of a motor unlike the existing method employing hydraulic pressure, is usually installed in vehicles these days.

In such an EPS system, an electronic control unit (ECU) operates a motor according to driving conditions of a vehicle sensed by a speedometer, a torque sensor, and the like. Accordingly, the EPS system provides light and convenient feeling of steering during driving at low speed, provides heavy feeling of steering and sufficient directional stability during high-speed driving, and allows rapid steering in an emergency, thereby giving optimal conditions of steering to a driver.

An ECU of an existing EPS system measures a torque applied to a torsion bar and an absolute steering angle, which is the amount of rotation of a steering input shaft (IS), by using a first angle device for calculating an absolute steering angle and second and third angle devices for calculating a relative steering angle.

According to the existing method of sensing a torque and a steering angle, when failure occurs in the first, second, or third angle device, it is not possible to calculate either a torque value or a steering angle. Consequently, steering assistance is not controlled, and the stability of a vehicle may be considerably degraded.

SUMMARY OF THE INVENTION

In this background, the present disclosure is to provide an apparatus and method for acquiring information required for steering even upon occurrence of failure in some sensors.

Also, the present disclosure is to provide an electric power steering (EPS) apparatus, a steering information detection apparatus, etc. in which a plurality of torque sensors and absolute angle sensors (rotation angle sensors) are provided and it is determined whether sensor output values are synchronized so that steering is controlled normally even upon occurrence of failure in some sensors.

Further, the present disclosure is to provide an apparatus and method for sensing an offset of the installation position of a sensor device at a steering shaft.

To solve the foregoing problem, an embodiment provides an apparatus for detecting steering information, the apparatus including: first to fourth torque sensors configured to sense a relative rotation angle according to distortion of a steering input shaft (IS), a steering output shaft (OS), and a torsion bar disposed between the steering IS and OS; first to fourth rotation angle sensors configured to sense an absolute rotation angle of the steering IS or OS; a first synchronization checker configured to check synchronization states of output values of the four torque sensors; a second synchronization checker configured to check synchronization states of output values of the four rotation angle sensors; a torque calculator configured to calculate a torque value on the basis of at least one of the output values of the four torque sensors according to determination results of the first and second synchronization checkers; and a steering angle calculator configured to calculate a steering angle on the basis of at least one of the output values of the four torque sensors and at least one of the output values of the four rotation angle sensors according to the determination results of the first and second synchronization checkers.

Another embodiment provides an apparatus for detecting steering information, the apparatus including: a torque sensor configured to sense a relative rotation angle according to distortion of a torsion bar disposed between a steering IS and a steering OS; an offset sensing device including an interference member configured to radially protrude from a circumferential surface of the steering IS or OS, and an offset sensor configured to be installed on a rotation member fixed at one end of the steering OS or IS and generate an output signal according to movement relative to the interference member; and a torque calculator configured to calculate a torque applied to the torsion bar from the relative rotation angle output from the torque sensor.

Still another embodiment provides a method of detecting steering information, the method including: outputting, by first to fourth torque sensors, relative rotation angle information according to distortion of a torsion bar disposed between a steering IS and a steering OS; outputting, by first to fourth rotation angle sensors, absolute rotation angle information of the steering IS or OS; a first synchronization checking operation of checking synchronization states of output values of the four torque sensors; a second synchronization checking operation of checking synchronization states of output values of the four rotation angle sensors; a torque calculation operation of calculating a torque value on the basis of at least one of the output values of the four torque sensors according to results of the first synchronization checking operation; and a steering angle calculation operation of calculating a steering angle on the basis of at least one of the output values of the four torque sensors and at least one of the output values of the four rotation angle sensors according to results of the first and second synchronization checking operations.

BRIEF DESCRIPTION OF THE DRAWINGS

The above and other aspects, features and advantages of the present disclosure will be more apparent from the following detailed description taken in conjunction with the accompanying drawings, in which:

FIG. 2 is a functional block diagram of an apparatus for detecting steering information according to an embodiment of the present disclosure;

DETAILED DESCRIPTION OF THE EXEMPLARY EMBODIMENTS

Figure 1:
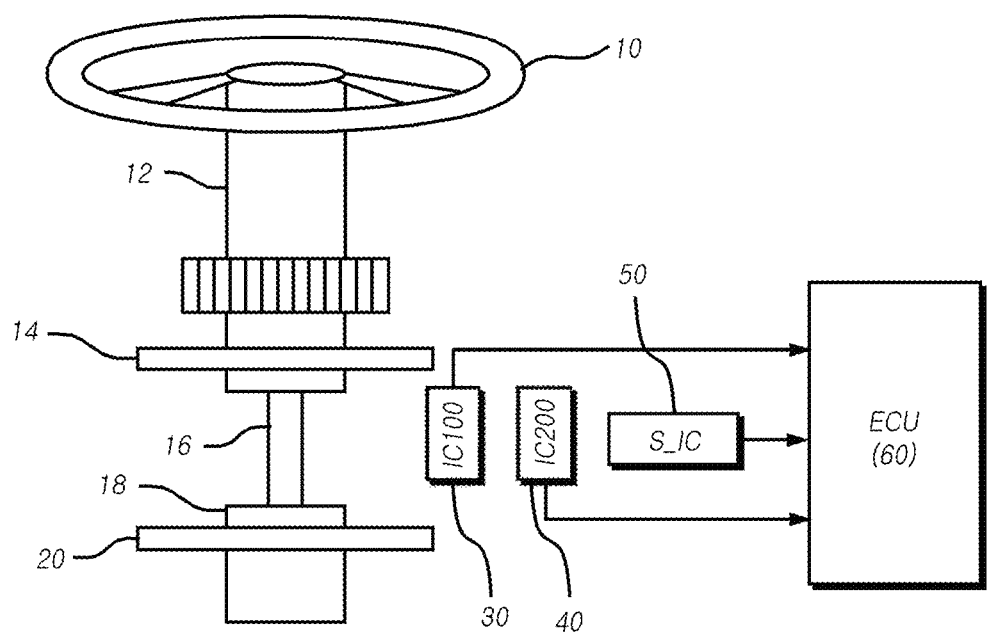
FIG. 1 is a diagram illustrating an apparatus for detecting a steering angle and a torque in a general electric power steering (EPS) system.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

FIG. 1 is a diagram illustrating a general electric power steering (EPS) system which is in contrast with the present disclosure.

An EPS system of FIG. 1 includes a torque sensor including a first rotor 14 and a second rotor 20, and an electronic control unit (ECU) 60 which determines a reference steering angle on the basis of information sensed by the torque sensor, verifies relative steering angles received from second and third angle devices 30 and 40, and determines a verified final absolute steering angle.

The first rotor 14 is connected to an input shaft (IS) 12, and the second rotor 20 is connected to an output shaft (OS) 18. The IS 12 is coupled to a steering wheel 10 provided in a driver's seat, and the OS 18 may be coupled to a lower steering structure (e.g., a pinion gear) connected to tires. When the IS 12 is rotated by an external force, a turning force of the IS 12 is transferred to the OS 18 through a torsion bar 16, and thus the OS 18 is also rotated.

The torsion bar 16 is provided between the first rotor 14 and the second rotor 20 to measure the degree of distortion between the IS 12 and the OS 18.

A first angle device 50 provides an absolute steering angle, which is a rotation angle of the first rotor 14, to the ECU 60. The first angle device 50 may be disposed to be parallel to the first rotor 14.

The second and third angle devices 30 and 40 are disposed under the first rotor 14 and provide relative steering angles of the first and second rotors 14 and 20 to the ECU 60, respectively.

The ECU 60 determines the reference steering angle by using the steering angles received from the first to third angle devices 30, 40, and 50 and a Vernier algorithm, and tracks movement of the first rotor 14 on the basis of the determined reference steering angle. With regard to movement of the first rotor 14, each of first and second absolute steering angles may be calculated by using the reference steering angle and the relative steering angles received from the second and third angle devices 30 and 40.

Here, the second angle device 30 and the third angle device 40 may be referred to as a first torque sensor and a second torque sensor, and the first angle device 50 may be referred to as a steering angle sensor or a rotation angle sensor.

Meanwhile, when failure occurs in at least one of the first to third angle devices in the EPS system having the constitution shown in FIG. 1, it is not possible to calculate either a torque value or a steering angle. Consequently, steering assistance is not controlled, and the stability of a vehicle may be problematic.

In particular, in an autonomous vehicle and the like which has currently been under development, a steering system is not used as an auxiliary steering system for assisting manual steering control and is automatically operated to steer the vehicle on its own without a steering input of a driver.

Therefore, in a steering system used in such an autonomous vehicle and the like, safety may be further problematic because the steering control is completely terminated when failure occurs in an angle device and it is not possible to measure either a torque value or a steering angle, as mentioned above.

Also, a sensor that is an angle device installed at each of an IS and an OS, which are steering structures, is fixed by instrumental installation (caulking). Therefore, when sudden steering is performed or a strong steering force is applied, an offset problem occasionally occurs, that is, the center point of a sensor is changed due to damage of an installation portion caused by impact.

Accordingly, an embodiment of the present disclosure proposes a constitution that includes four torque sensors for sensing a torque and four rotation angle sensors for sensing an absolute rotation angle in preparation for failure of first to third angle devices, senses a torque sensor and a rotation angle sensor in which failure has occurred by monitoring whether output values of the four torque sensors are synchronized and whether output values of the four rotation angle sensors are synchronized, and excludes an output value of the sensors in which failure has occurred from calculation of a torque value and a steering angle.

FIG. 2 is a functional block diagram of an apparatus for detecting steering information according to an embodiment of the present disclosure.

As shown in FIG. 2, an apparatus for detecting steering information according to an embodiment of the present disclosure may include first to fourth torque sensors 410 to 440 which are four torque sensors for sensing a relative rotation angle according to distortion of a torsion bar disposed between a steering IS and a steering OS, first to fourth rotation angle sensors 510 to 540 which are four rotation angle sensors for sensing an absolute rotation angle of the steering IS or OS, a first synchronization checker 610 for checking synchronization states of output values of the four torque sensors, a second synchronization checker 620 for checking synchronization states of output values of the four rotation angle sensors 510 to 540, a torque calculator 700 for calculating a torque value on the basis of at least one of the output values of the four torque sensors according to determination results of the first and second synchronization checkers 610 and 620, and a steering angle calculator 800 for calculating a steering angle on the basis of at least one of the output values of the four torque sensors and at least one of the output values of the four rotation angle sensors according to the determination results of the first and second synchronization checkers 610 and 620.

In other words, the apparatus for detecting steering information according to this embodiment of the present disclosure includes four relative rotation angle sensors for calculating a torque, four rotation angle sensors for measuring an absolute rotation angle of a steering shaft, determines failure of a sensor by determining whether output values of respective sensors are identical, and calculates a torque value and a steering angle by using only output values of sensors in a normal state.

In this specification, four torque sensors and four rotation angle sensors are described as an example, but the number of torque sensors and the number of rotation angle sensors are not limited thereto. In other words, the present disclosure encompasses an embodiment that includes a plurality of torque sensors and rotation angle sensors and calculates a torque and a steering angle by determining whether a plurality of sensors are synchronized. For convenience of understanding, a case in which there are four torque sensors and four rotation angle sensors will be described below.

Figure 3A:
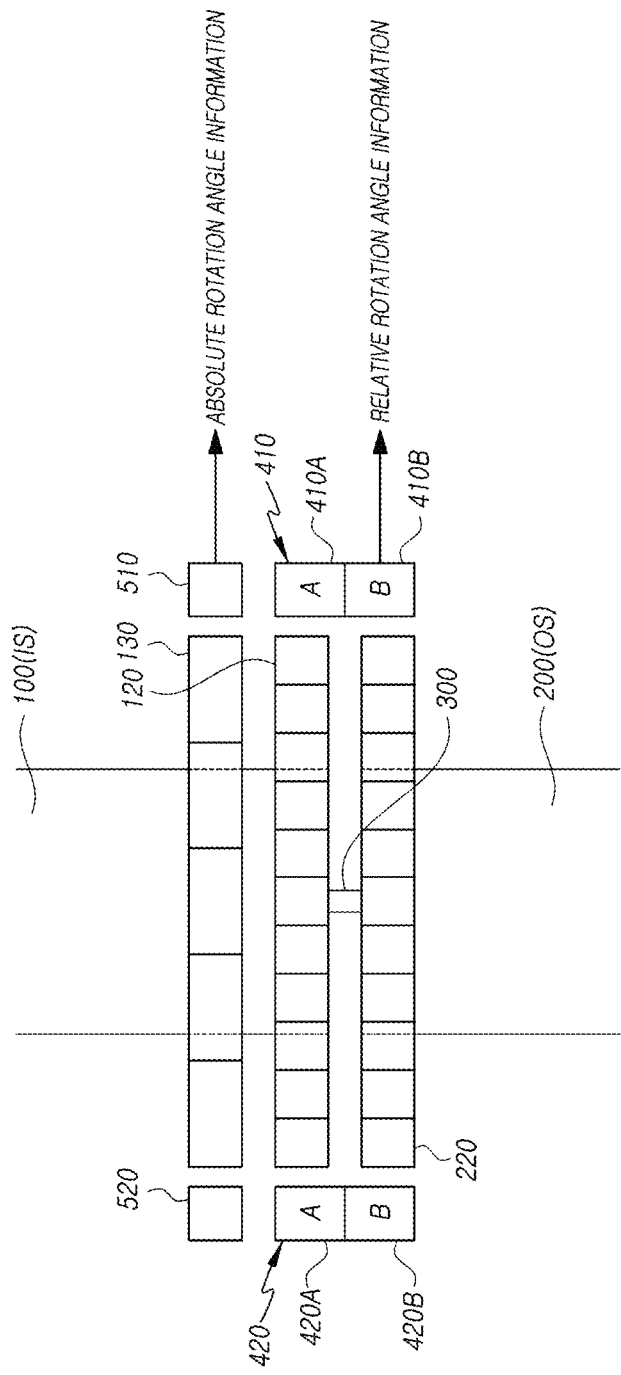
FIGS. 3A, 3B and 3C show detailed structures of an apparatus for detecting steering information according to an embodiment of the present disclosure.

FIG. 3 shows a detailed structure of an apparatus for detecting steering information according to an embodiment of the present disclosure.

As shown in FIG. 3, a steering shaft includes a steering IS 100 connected to a steering wheel or a steering column, and a steering OS 200 connected to a pinion gear and the like, and a torsion bar 300 which is a distortion means is fixed between the steering IS 100 and the steering OS 200.

A first input-side rotation member 120 and a second input-side rotation member 130 are fixed at one end of the steering IS 100.

The two input-side rotation members 120 and 130 rotate with the steering IS 100, and an offset sensing device, which will be described in detail below with reference to FIG. 4, may be further included to sense deviation from an initial installation position, that is, a center position.

The first and second input-side rotation members 120 and 130 may also be referred to as rotors, and may be circular flat panel members respectively having N and M gear teeth or holes. The first and second input-side rotation members 120 and 130 allow sensors adjacent thereto to calculate a rotation angle of the steering IS 100 by measuring the amount of rotation thereof.

Here, together with an output-side rotation member 220 which will be described below, the first input-side rotation member 120 is used for the first to fourth torque sensors 410 to 440 to measure relative rotation angle information.

Meanwhile, the output-side rotation member 220 is fixed at one end of the steering OS 200 and thus may also be referred to as an output-side rotor. Like the first input-side rotation member 120, the output-side rotation member 220 may be a circular flat panel member having N gear teeth or holes.

The first input-side rotation member 120 and the output-side rotation member 220 disposed to face each other with the torsion bar 300 interposed therebetween are intended to measure the degree of relative rotation between the steering IS 100 and the steering OS 200.

In other words, the first to fourth torque sensors 410 to 440 disposed around the first input-side rotation member 120 and the output-side rotation member 220 output a difference in rotation angle, that is, relative rotation angle information, between the first input-side rotation member 120 and the output-side rotation member 220 temporarily caused by distortion of the torsion bar 300. The output relative rotation angle information is used for the torque calculator 700 to calculate a torque value as will be described below.

Also, the second input-side rotation member 130 disposed at the steering IS 100 is used as a means for measuring an absolute rotation angle of the steering IS 100.

In other words, the first to fourth rotation angle sensors 510 to 540 disposed around the second input-side rotation member 130 output a rotation angle of the second input-side rotation member 130, that is, an absolute rotation angle information of the steering IS 100. The steering angle calculator 800 calculates a final steering angle according to the Vernier algorithm by using the output absolute rotation angle information and the aforementioned relative rotation angle information.

Meanwhile, according to this embodiment of the present disclosure, the four torque sensors, that is, the first torque sensor 410, the second torque sensor 420, the third torque sensor 430, and the fourth torque sensor 440, are disposed around the first input-side rotation member 120 and the output-side rotation member 220.

All the four torque sensors 410 to 440 may be in the same form, and each may include an A sensor for measuring a rotation angle of the first input-side rotation member 120 and a B sensor for measuring a rotation angle of the output-side rotation member 220.

In other words, the first torque sensor 410 includes an A sensor 410A disposed around the first input-side rotation member 120 and a B sensor 410B disposed around the output-side rotation member 220.

The first torque sensor 410 may calculate relative rotation angle information indicating a relative rotation angle between the steering IS 100 and the steering OS 200 by using a difference in measured value between the A sensor 410A and the B sensor 410B.

In other words, since the first input-side rotation member 120 and the output-side rotation member 220 are in the same form, the A sensor 410A and the B sensor 410B output the same value when no torque is applied to the torsion bar 300, and the A sensor 410A and the B sensor 410B output different values when a difference in the amount of rotation between the steering IS 100 and the steering OS 200 is temporarily caused by a torque applied to the torsion bar 300.

Therefore, each torque sensor may determine a relative rotation angle by comparing a differential value Diff., which is a difference in output value between an A sensor and a B sensor, with a preset value.

Figure 3B:
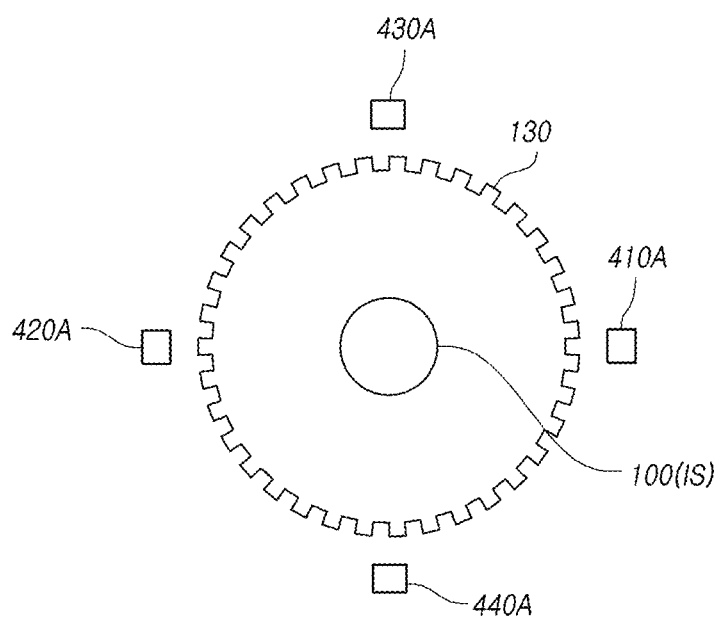

Also, the four torque sensors 410 to 440 may be scatterred around a rotation member. As shown in FIG. 3B, each of the four torque sensors 410 to 440 may be scatterred to be spaced apart by 90 degrees, but an arrangement of the four torque sensors 410 to 440 is not limited thereto. Torque sensors may be disposed to be spaced apart by other angles according to the number thereof.

Meanwhile, the four rotation angle sensors, that is, the first rotation angle sensor 510, the second rotation angle sensor 520, the third rotation angle sensor 530, and the fourth rotation angle sensor 540, are scattered and disposed around the second input-side rotation member 130.

Figure 3C:
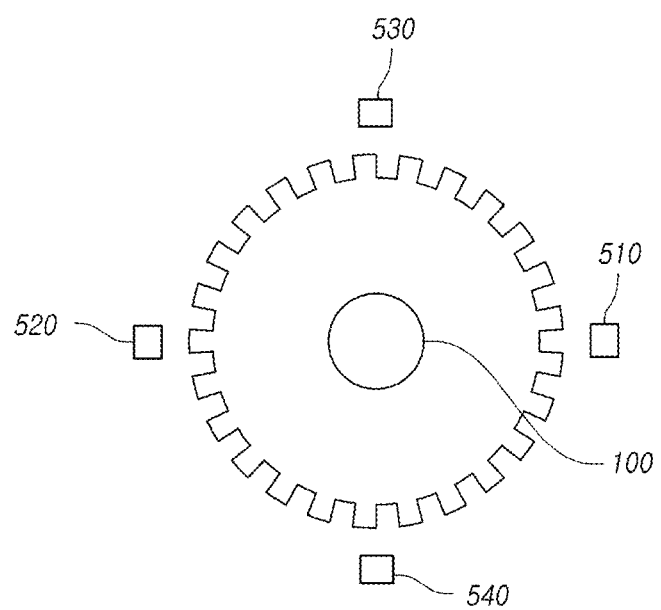

In other words, the four rotation angle sensors 510 to 540 may be scattered and disposed around the second input-side rotation member 130. As shown in FIG. 3C, each of the four rotation angle sensors 510 to 540 may be scatterred to be spaced apart by 90 degrees, but an arrangement of the four rotation angle sensors 510 to 540 is not limited thereto. Rotation angle sensors may be disposed to be spaced apart by other angles according to the number thereof.

Each rotation angle sensor detects the amount of rotation, that is, an absolute rotation angle, of the second input-side rotation member 130.

Such a rotation angle sensor may output a pulse width modulation (PWM) signal proportionate to the amount of rotation of the second input-side rotation member 130.

It has been described above that rotation members and rotation angle sensors for measuring an absolute angle of a steering shaft are disposed on an IS side. However, an arrangement of rotation members and rotation angle sensors is not limited thereto, and rotation members and rotation angle sensors may be disposed on an OS side. The above-described torque sensors and rotation angle sensors may also be referred to as torque integrated circuits (ICs) and hall ICs.

Meanwhile, a rotation angle sensor outputs an absolute rotation angle of a steering shaft, and the output absolute rotation angle has a value of 360 degrees or less.

In other words, a rotation angle sensor is not able to output a final steering angle which reflects multiple turns exceeding 360 degrees, and thus an output value of a torque sensor is additionally used to calculate final steering angle information.

N, which is the number of gear teeth/holes of the second input-side rotation member 130 for measuring an absolute rotation angle, differs from M, which is the number of gear teeth/holes of the first input-side rotation member 120, which is a target of the torque sensors.

Therefore, when absolute rotation angle information, which is an output value of the rotation angle sensors, and an output value of the torque sensors are both applied to the Vernier algorithm, it is possible to measure a final steering angle in which multiple turns are taken into consideration.

To this end, although not shown in the drawings, the apparatus for detecting steering information according to this embodiment may include a plurality of angle followers.

According to this embodiment, reference steering angle information, which is multi-turn angle information, is calculated first by using an absolute steering angle measured by the rotation angle sensors, another rotation angle information measured by the torque sensors, and the Vernier algorithm.

Next, values output from the torque sensors and the rotation angle sensors may be monitored according to time, and a final steering angle may be continuously calculated by applying the output values to the calculated reference steering angle. To this end, the plurality of angle followers are included.

Meanwhile, the first synchronization checker 610 according to this embodiment functions to check synchronization states of output values of the four torque sensors.

In other words, the first synchronization checker 610 functions to determine a synchronized torque sensor and a non-synchronized torque sensor by comparing values output by the four torque sensors 410 to 440 in several channels or manners.

Here, all synchronized torque sensors provide substantially the same output value and may be considered to be in a normal state. A non-synchronized torque sensor generates an output value different from output values of other torque sensors and may be considered to be in an abnormal or failure state.

For example, when output values of the first to third torque sensors 410 to 430 are substantially the same and only an output value of the fourth torque sensor 440 is different, the first to third torque sensors 410 to 430 are determined to be synchronized torque sensors in the normal state, and the fourth torque sensor 440 is determined to be a non-synchronized torque sensor in the failure state.

In other words, each torque sensor includes an A sensor for sensing the amount of rotation of the steering IS 100 and a B sensor for sensing the amount of rotation of the steering OS 200. The first synchronization checker 610 determines that an $i^{th}$ torque sensor (i=1, 2, 3, and 4) and a $j^{th}$ torque sensor (j=1, 2, 3, and 4; i≠j) are synchronized only when a difference between an output value of the A or B sensor of the $i^{th}$ torque sensor (i=1, 2, 3, and 4) and an output value of the A or B sensor of the $j^{th}$ torque sensor (j=1, 2, 3, and 4; i≠j) is less than or equal to a threshold value.

Operation of the first synchronization checker 610 will be described in further detail below as an example.

First, the first synchronization checker 610 compares an output value of the A sensor 410A of the first torque sensor 410 and an output value of an A sensor 420A of the second torque sensor 420 or compares an output value of the B sensor 410B of the first torque sensor 410 and an output value of a B sensor 420B of the second torque sensor 420 (Sync. Check (1A-2A) or Sync. Check (1B-2B)).

Likewise, the first synchronization checker 610 compares an output value of an A sensor 430A of the third torque sensor 430 and an output value of an A sensor 440A of the fourth torque sensor 440 or compares an output value of a B sensor 430B of the third torque sensor 430 and an output value of a B sensor 440B of the fourth torque sensor 440 (Sync. Check (3A-4A) or Sync. Check (3B-4B)).

Next, the first synchronization checker 610 finally checks synchronization among the four torque sensors 410 to 440 by comparing a result of comparison between the output values of the first and second torque sensors 410 and 420 and a result of comparison between the output values of the third and fourth torque sensors 430 and 440 (Sync. Check ((1A-2A)-(3A-4A)) or Sync. Check ((1B-2B)-(3B-4B))).

Alternatively, with regard to two or more synchronized torque sensors determined by comparing output values of an A sensor and a B sensor, the first synchronization checker 610 may compare relative rotation angle information determined as differential values between output values of A sensors and B sensors, and determine a torque sensor which outputs different relative rotation angle information to be in the failure state. In other words, the first synchronization checker 610 may initially compare output values of each torque sensor on the basis of an IS or OS rotation angle, and subsequently compare relative rotation angle information of torque sensors determined to be in the normal state, thereby finally determining a torque sensor in the normal state or the failure state.

Separately from or in addition to such a synchronization check, the first synchronization checker 610 may determine whether relative rotation angle information of the respective torque sensors 410 to 440, that is, differential values between output values of A sensors and B sensors of the respective torque sensors 410 to 440, has substantially the same value.

In other words, the first synchronization checker 610 compares relative rotation angle information of the first torque sensor 410, that is, a differential value between output values of the A and B sensors 410A and 410B of the first torque sensor 410 (Diff. Angle (1B-1A)), and a differential value between output values of the A and B sensors 420A and 420B of the second torque sensor 420 (Diff. Angle (2B-2A)).

Likewise, the first synchronization checker 610 compares a differential value between output values of the A and B sensors 430A and 430B of the third torque sensor 430 (Diff. Angle (3B-3A)) and a differential value between output values of the A and B sensors 440A and 440B of the fourth torque sensor 440 (Diff. Angle (4B-4A)).

Through this process, the first synchronization checker 610 may determine whether the four torque sensors 410 to 440 are synchronized, that is, a torque sensor in the normal state and a torque sensor in the abnormal (failure) state.

The second synchronization checker 620 according to this embodiment functions to check synchronization states of output values of the four rotation angle sensors 510 to 540.

In other words, the second synchronization checker 620 functions to determine a synchronized rotation angle sensor and a non-synchronized rotation angle sensor by comparing values output by the four rotation angle sensors 510 to 540 in several channels or manners.

Here, all synchronized rotation angle sensors provide substantially the same output value (absolute rotation angle information) and may be considered to be in a normal state. A non-synchronized rotation angle sensor generates an output value different from output values of other rotation angle sensors and may be considered to be in an abnormal or failure state.

For example, when output values of the first to third rotation angle sensors 510 to 530 are substantially the same and only an output value of the fourth rotation angle sensor 540 is different, the first to third rotation angle sensors 510 to 530 are determined to be synchronized rotation angle sensors in the normal state, and the fourth rotation angle sensor 540 is determined to be a non-synchronized rotation angle sensor in the failure state.

Through this process, the second synchronization checker 620 may determine whether the four rotation angle sensors 510 to 540 are synchronized, that is, a rotation angle sensor in the normal state and a rotation angle sensor in the abnormal (failure) state.

The torque calculator 700 according to this embodiment functions to calculate a torque value on the basis of at least one of output values of the four torque sensors 410 to 440 according to determination results of the first synchronization checker 610.

More particularly, the torque calculator 700 calculates a torque applied to the torsion bar 300 on the basis of an output value, that is, relative rotation angle information, of synchronized torque sensors which are determined to be in the normal state by the first synchronization checker 610.

For example, the torque calculator 700 may calculate a torque value on the basis of average relative rotation angle information of torque sensors which are determined to be synchronized by the first synchronization checker 610. In other words, the torque calculator 700 may calculate a torque value by using relative rotation angle information of one torque sensor when the single torque sensor is determined to be synchronized, and may calculate a torque value by using an average value of relative rotation angle information of N torque sensors when the N torque sensors are determined to be synchronized. In other words, with regard to each of two or more synchronized torque sensors determined by the first synchronization checker 610, the torque calculator 700 may determine a differential value between output values of an A sensor and a B sensor as a relative rotation angle of the corresponding torque sensor, and calculate a torque value on the basis of an average value of relative rotation angle information of the two or more torque sensors.

Also, when there are two or more synchronized torque sensors, the torque calculator 700 may average output values of the two or more torque sensors in the normal state and calculate a torque value on the basis of the average value so as to improve accuracy of data.

In this embodiment, preset priority orders may be given to the four torque sensors, and then output values of the torque sensors may be selectively used according to the priority orders.

For example, the priority orders may be sequentially given to the first to fourth torque sensors 410 to 440, the first to third torque sensors 410 to 430 may be in the normal state, and the fourth torque sensor 440 may be in the failure state. In this case, output values of two torque sensors which have high priority orders, that is, the first torque sensor 410 and the second torque sensor 420, may be averaged, and a torque value may be calculated on the basis of the average value.

Needless to say, when only one torque sensor is determined to be in the normal state by the first synchronization checker 610, a torque value may be calculated from only an output value of the torque sensor.

Here, output values or average values of torque sensors and torque values corresponding thereto may be provided in the form of a table, and it is possible to calculate a torque value corresponding to output values or an average value by referring to the table.

On the basis of the calculated torque value, a controller of a steering assist system may calculate an assist current applied to a steering motor, and assist steering.

Table 1 below exemplifies a torque calculation method according to whether four torque sensors are synchronized in this embodiment, but the torque calculation method is not limited to Table 1.

TABLE 1

| Number of cases | | Torque sensor 1 | Torque sensor 2 | Torque sensor 3 | Torque sensor 4 | Base value for torque calculation (Diff. Angle) |
|---|---|---|---|---|---|---|
| 1 | One failure | ○ | ○ | ○ | X | Use average value of Diff of TS 1 and Diff of TS 2 |
| 2 | | ○ | ○ | X | ○ | Use average value of Diff of TS 1 and Diff of TS 2 |
| 3 | | ○ | X | ○ | ○ | Use average value of Diff of TS 1 and Diff of TS 3 |
| 4 | | X | ○ | ○ | ○ | Use average value of Diff of TS 2 and Diff of TS 3 |
| 5 | Two failures | ○ | ○ | X | X | Use average value of Diff of TS 1 and Diff of TS 2 |
| 6 | | ○ | X | ○ | X | Use average value of Diff of TS 1 and Diff of TS 3 |
| 7 | | ○ | X | X | ○ | Use average value of Diff of TS 1 and Diff of TS 4 |
| 8 | | X | ○ | ○ | X | Use average |

TABLE 1-continued

| Number of cases | | Torque sensor 1 | Torque sensor 2 | Torque sensor 3 | Torque sensor 4 | Base value for torque calculation (Diff. Angle) |
|---|---|---|---|---|---|---|
| 9 | | X | O | X | O | Use average value of Diff of TS 2 and Diff of TS 4 |
| 10 | | X | X | O | O | Use average value of Diff of TS 3 and Diff of TS 4 |
| 11 | Three failures | O | X | X | X | Use Diff. output value of TS 1 |
| 12 | | X | O | X | X | Use Diff. output value of TS 2 |
| 13 | | X | X | O | X | Use Diff. output value of TS 3 |
| 14 | | X | X | X | O | Use Diff. output value of TS 4 |
| 15 | Four failures | X | X | X | X | Output sensor error |
| 16 | No failure | O | O | O | O | Use average value of Diff of TS 1 and Diff of TS 2 |

Meanwhile, the torque calculator 700 may calculate a torque value on the basis of a torque sensor group.

For example, torque sensors may be classified into a plurality of torque sensor groups. As an example, four torque sensors may be classified into two torque sensor groups. In other words, the first torque sensor 410 and the second torque sensor 420 may be classified as a first torque sensor group, and the third torque sensor 430 and the fourth torque sensor 440 may be classified as a second torque sensor group.

In this case, the torque calculator 700 may calculate a torque value applied to the torsion bar 300 by using relative rotation angle information of torque sensors included in a torque sensor group which is selected after a synchronization state of the torque sensor group is checked according to a determination of the first synchronization checker 610. In other words, the torque calculator 700 may calculate a torque value by using the first torque sensor group or the second torque sensor group.

A torque sensor group used to calculate a torque value may be a group in which all synchronization states of one or more torque sensors are determined to be the normal state. For example, the first synchronization checker 610 may determine whether each torque sensor is synchronized by using the above-described method. When the third torque sensor 430 is determined to be in the failure state and the other torque sensors are determined to be in the normal state, the torque calculator 700 may exclude relative rotation angle information of the second torque sensor group including the third torque sensor 430 in the failure state and calculate a torque value by using only average relative rotation angle information of the first torque sensor 410 and the second torque sensor 420 included in the first torque sensor group.

In another example, when a plurality of torque sensor groups are selected, only a torque sensor group which is given the highest priority order according to preset priority orders may be used to calculate a torque value.

Meanwhile, the steering angle calculator 800 according to this embodiment functions to calculate a steering angle on the basis of at least one of output values of the four torque sensors 410 to 440 and at least one of output values of the four rotation angle sensors 510 to 540 according to determination results of the first and second synchronization checkers 610 and 620.

More particularly, the steering angle calculator 800 calculates a final steering angle on the basis of output values of one or two torque sensors which are determined to be in the normal state by the first synchronization checker 610 and output values of one or more rotation angle sensors which are determined to be in the normal state by the second synchronization checker 620.

Here, output values of torque sensors used by the steering angle calculator 800 may be an output value of only one torque sensor or an average value of outputs of two torque sensors in the normal state.

Likewise, output values of rotation angle sensors used by the steering angle calculator 800 may be an output value of one of rotation angle sensors in the normal state or an average value of outputs of two rotation angle sensors in the normal state.

As described above, a rotation angle sensor outputs an absolute rotation angle of a steering shaft, which has a value of 360 degrees or less, but is not able to output final steering angle information which reflects multiple turns exceeding 360 degrees.

Therefore, the steering angle calculator 800 can calculate a final steering angle in which multiple turns are taken into consideration by applying absolute rotation angle information, which is an output value of a rotation angle sensor, and an output value of a torque sensor together to the Vernier algorithm.

Even in this case, it is possible to give priority orders to four rotation angle sensors and then selectively use output values of rotation angle sensors according to the priority orders.

For example, the priority orders may be sequentially given to the first to fourth rotation angle sensors 510 to 540, the first to third rotation angle sensors 510 to 530 may be in the normal state, and the fourth rotation angle sensor 540 may be in the failure state. In this case, an output value of the single rotation angle sensor 510 which has the highest priority order may be used, or output values of the first rotation angle sensor 510 and the second rotation angle sensor 520 which are two rotation angle sensors having high priority orders may be averaged, and a steering angle value may be calculated on the basis of the output value of the single rotation angle sensor 510 or the average value.

The controller of the steering assist system performs steering control on the basis of the calculated steering angle value.

Table 2 below exemplifies a steering angle calculation method according to whether four torque sensors are synchronized and whether four rotation angle sensors are synchronized in this embodiment, but the steering angle calculation method is not limited to Table (in Table 2, TS denotes a torque sensor, AS denotes a M rotation angle sensor, O denotes the normal state, and X denotes the failure state).

TABLE 2

| TS 1 | TS 2 | TS 3 | TS 4 | AS 1 | AS 2 | AS 3 | AS 4 | Base value for steering angle calculation |
|---|---|---|---|---|---|---|---|---|
| O | O | O | X | O | O | O | X | Average value of Diff of TS 1 and Diff of TS 2 + Output value of AS 1 |
| O | O | O | X | X | O | X | X | Average value of Diff of TS 1 and Diff of TS 2 + Output value of AS 2 |
| O | O | O | X | X | X | O | O | Average value of Diff of TS 1 and Diff of TS 2 + Output value of AS 3 |
| O | O | O | X | X | X | X | O | Average value of Diff of TS 1 and Diff of TS 2 + Output value of AS 4 |
| O | O | O | X | X | X | X | X | It is possible to calculate relative angle but impossible to output steering angle |
| X | O | O | O | X | O | O | X | Average value of Diff of TS 2 and Diff of TS 3 + Output value of AS 1 |

Meanwhile, an error output unit 910 may output a sensor error signal when it is determined by the first or second synchronization checker 610 or 620 that failure has occurred in all of the four torque sensors 410 to 440 or all of the four rotation angle sensors 510 to 540.

More particularly, when it is determined by the first synchronization checker 610 that failure has occurred in all of the four torque sensors 410 to 440, a torque sensor error signal is output. In this case, it is not possible to calculate either a torque value or a steering angle.

Meanwhile, when it is determined by the second synchronization checker 620 that failure has occurred in all of the four rotation angle sensors 510 to 540, a rotation angle sensor error signal is output. In this case, it is possible to calculate a torque value but not possible to calculate a steering angle.

As described above, four torque sensors and four rotation angle sensors are used, and after it is determined whether an output value of each sensor is synchronized, a torque and a steering angle are calculated accordingly. Therefore, even upon occurrence of failure in some sensors, it is possible to calculate a torque and a steering angle normally, and thus steering control is possible.

Figure 4A:
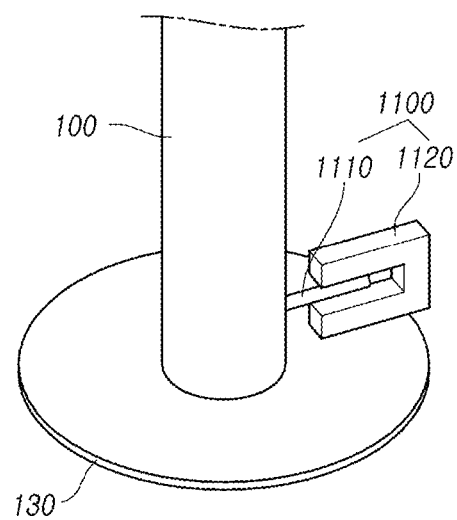
FIGS. 4A and 4B show detailed constitutions of an offset sensing device used in an embodiment of the present disclosure.
Figure 4B:
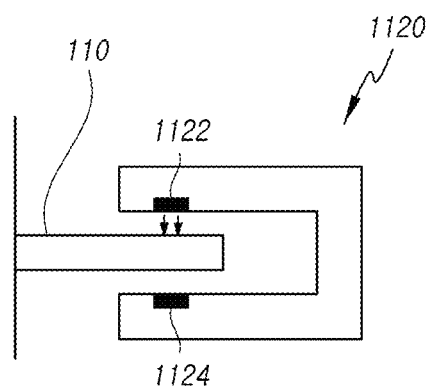

FIG. 4 shows a detailed constitution of an offset sensor used in an embodiment of the present disclosure.

As described above, one or more rotation members are fixed at the steering IS and the steering OS to sense a torque or a rotation angle.

Such a rotation member is fixed at each of an IS and an OS which are steering structures. When sudden steering is performed and a strong steering force is applied to a steering shaft, an offset problem occasionally occurs, that is, the center point or initial installation position of a sensor is changed due to damage of a rotation member and an installation portion of the steering shaft caused by impact.

To solve this problem, the apparatus for detecting steering information according to this embodiment may further include an offset sensing device 1100 as shown in FIG. 4.

More particularly, an apparatus for detecting steering information according to the embodiment of FIG. 4 may include a torque sensor (not shown) for sensing a relative rotation angle according to distortion of the torsion bar disposed between the steering IS and the steering OS, the offset sensing device 1100 including an interference member 1110 radially protruding from a circumferential surface of the steering IS or OS and an offset sensor 1120 installed on the rotation member 130 fixed at one end of the steering IS or OS and generating an output signal according to movement relative to the interference member 1110, and a torque calculator calculating a torque applied to the torsion bar from the relative rotation angle output from the torque sensor.

Here, the offset sensing device 1100 according to this embodiment may include the interference member 1110 which radially protrudes from a circumferential surface of the steering IS or OS, and the offset sensor 1120 which is installed on the rotation member 130 fixed at one end of the steering IS or OS and which generates an output signal according to movement relative to a protruding portion.

The offset sensor 1120 may be a photointerrupter which generates different output signals according to relative movement of the interference member 1110, and the offset sensing device 1100 may sense deviation of the rotation member 130 from an initial installation position at the steering IS or OS.

More particularly, as shown in FIG. 4, a protruding portion which radially protrudes by a certain distance from the circumferential surface of the steering IS is formed as the interference member 1110 near the rotation member 130 fixed at one end of the steering IS 100.

Meanwhile, the offset sensor 1120 in the form of a photointerrupter composed of a light transmitting device 1122 and a light receiving device 1124 is installed on a surface of the rotation member 130, and the interference member 1110 is disposed to pass between the light transmitting device 1122 and the light receiving device 1124 of the offset sensor 1120 when the rotation member 130 does not deviate from an installation position at the steering IS.

For example, if the interference member 1110 is initially disposed between the light transmitting device 1122 and the light receiving device 1124 in a normal state, when the rotation member 130 deviates from an installation position at the steering shaft, the interference member 1110 deviates from the gap between the light transmitting device 1122 and the light receiving device 1124. Therefore, the offset sensor 1120 outputs a signal different from a signal of the initial state.

With the offset sensing device 1100, it is possible to sense deviation of the rotation member 130 from the installation position at the steering shaft, that is, an offset of the center point of a sensor.

Figure 5:
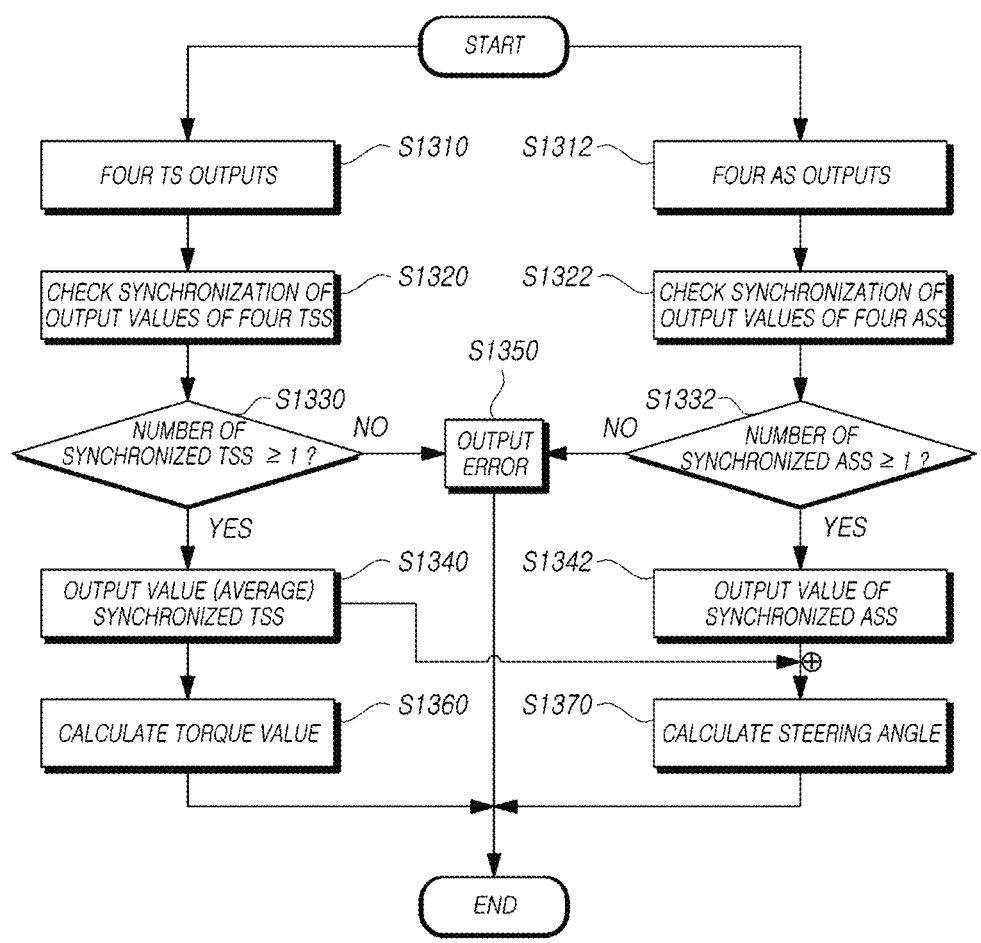
FIG. 5 illustrates an overall flowchart of a method of detecting steering information according to an embodiment of the present disclosure.

FIG. 5 illustrates an overall flowchart of a method of detecting steering information according to an embodiment of the present disclosure.

Referring to FIG. 5, a method of detecting steering information according to an embodiment of the present disclosure includes an operation in which first to fourth torque sensors output relative rotation angle information according to distortion of a torsion bar disposed between a steering IS and a steering OS (S1310), an operation in which first to fourth rotation angle sensors output absolute rotation angle information of the steering IS or OS (S1312), a first synchronization checking operation of checking synchronization states of output values of the four torque sensors (S1320), a second synchronization checking operation of checking synchronization states of output values of the four rotation angle sensors (S1322), a torque calculation operation of calculating a torque value on the basis of at least one of the output values of the four torque sensors according to results of the first synchronization checking operation, and a steering angle calculation operation of calculating a steering angle on the basis of at least one of the output values of the four torque sensors and at least one of the output values of the four rotation angle sensors according to results of the first and second synchronization checking operations.

More particularly, the torque calculation operation includes an operation of determining whether one or more torque sensors are determined to be in the normal state in the first synchronization checking operation and then outputting an error signal when there is no torque sensor in the normal state (S1350), and an operation of calculating a torque value by using output values, that is, relative rotation angle information, of torque sensors in the normal state when one or more torque sensors are in the normal state (S1340 and S1360).

As described above, when two or more torque sensors are in the normal state, an average value of output values of two torque sensors which have high priority orders or an output value of one of the torque sensors in the normal state may be used to calculate a torque value.

Also, the steering angle calculation operation includes an operation of determining whether one or more rotation angle sensors are determined to be in the normal state in the second synchronization checking operation (S1332), an operation of outputting an error signal when there is no rotation angle sensor in the normal state (S1350), and an operation of calculating a steering angle value by using output values, that is, absolute rotation angle information, of rotation angle sensors in the normal state and the output values, that is, the relative rotation angle information, of the torque sensors in the normal state when one or more rotation angle sensors are in the normal state (S1342 and S1370).

As described above, when two or more rotation angle sensors are in the normal state, it is possible to use an average value of output values of two rotation angle sensors which have high priority orders or an output value of one of the rotation angle sensors in the normal state.

Figure 6:
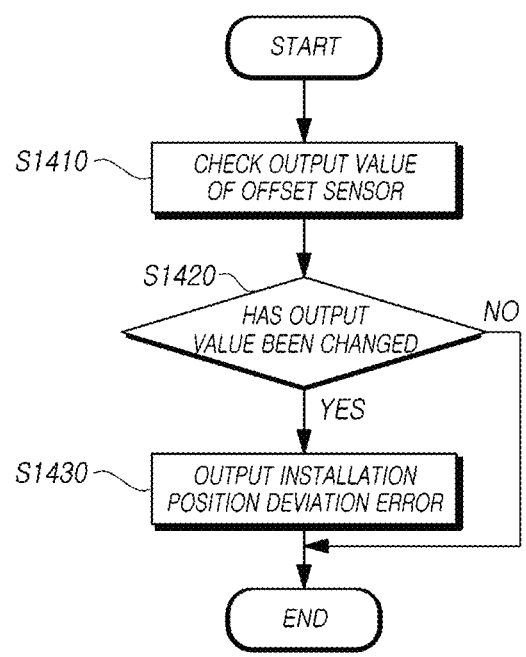
FIG. 6 illustrates an overall flowchart of a method of sensing deviation from an installation position according to an embodiment of the present disclosure.

FIG. 6 illustrates an overall flowchart of a method of sensing deviation from an installation position according to an embodiment of the present disclosure.

A method of sensing deviation of a sensor device from an installation position at a steering shaft as illustrated in FIG. 6 may be used together with the method of detecting steering information as illustrated in FIG. 5. However, the method of sensing deviation is not only used together with the method of detecting steering information but also is used independently.

In other words, the method of sensing deviation may include an operation of sensing deviation of the rotation member 130 from an initial installation position at the steering IS or OS by using the offset sensing device 1100 including, as shown in FIG. 4, the interference member 1110 radially protruding from a circumferential surface of the steering IS or OS and an offset sensor 1120 installed on the rotation member 130 fixed at one end of the steering IS or OS and generating an output signal according to movement relative to the interference member 1110.

More particularly, as shown in FIG. 6, an output value of the above-described offset sensor 1120 is measured at certain periods (S1410).

Next, it is determined whether an output value of the offset sensor 1120 has been changed in comparison to an output value of a previous period (S1420), and an installation position deviation error (i.e., a sensor center offset error) is output when the output value has been changed (S1430).

In other words, in the offset sensing device 1100 having the structure of FIG. 4, a sensed output value of the offset sensor 1120 is the same as an output value of a previous period without change when no offset (deviation) is made between a sensor rotation member and an initial installation position at a steering shaft, and an output value of the offset sensor 1120 is changed when the offset (deviation) is made between the sensor rotation member and the initial installation position at the steering shaft.

Therefore, by determining whether an output value of the offset sensor 1120 is changed at certain periods as described above, it is sensed whether the offset (deviation) occurs between the sensor rotation member and the initial installation position at the steering shaft, and a warning (error) signal is generated accordingly.

When the offset (deviation) is made between the sensor rotation member and the initial installation position at the steering shaft, it is not possible to acquire accurate steering information (a steering torque and a steering angle). Therefore, it is necessary to adjust the installation position of the sensor rotation member at the steering shaft.

As described above, according to embodiments of the present disclosure, it is possible to normally acquire steering torque, steering angle information, etc. required for steering even upon occurrence of failure in some of sensors used in an EPS system.

More particularly, a plurality of torque sensors and absolute angle sensors (rotation angle sensors) are provided, and after it is determined whether output values of respective sensors are synchronized, a torque and a steering angle are calculated accordingly. Therefore, it is possible to calculate a torque and a steering angle normally and control steering accordingly even upon occurrence of failure in some sensors.

Also, according to another embodiment of the present disclosure, it is possible to sense deviation of a rotation member from a installation position at a steering shaft, that is, an offset of the center point of a sensor, by using a part (the rotation member) of the sensor and an offset sensing device installed at the steering shaft. The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An apparatus for detecting steering information, the apparatus comprising:
    first to fourth torque sensors configured to sense a relative rotation angle according to distortion of a steering input shaft (IS), a steering output shaft (OS), and a torsion bar disposed between the steering IS and OS;
    first to fourth rotation angle sensors configured to sense an absolute rotation angle of the steering IS or OS;
    a first synchronization checker configured to check synchronization states of output values of the four torque sensors;
    a second synchronization checker configured to check synchronization states of output values of the four rotation angle sensors;
    a torque calculator configured to calculate a torque value based on at least one of the output values of the four torque sensors according to check results of the first and second synchronization checkers; and a steering angle calculator configured to calculate a steering angle based on at least one of the output values of the four torque sensors and at least one of the output values of the four rotation angle sensors according to the check results of the first and second synchronization checkers.

2. The apparatus of claim 1, wherein the torque calculator calculates the torque value applied to the torsion bar by using relative rotation angle information of two or more torque sensors whose synchronization states are determined to be a normal state by the first synchronization checker.

3. The apparatus of claim 1, wherein the steering angle calculator calculates the steering angle based on relative rotation angle information output from one or more torque sensors whose synchronization states are determined to be a normal state by the first synchronization checker and absolute rotation angle information output from one or more rotation angle sensors whose synchronization states are determined to be a normal state by the second synchronization checker.

4. The apparatus of claim 1, wherein the four torque sensors are classified into a plurality of torque sensor groups,
the torque calculator calculates the torque value applied to the torsion bar by using relative rotation angle information of torque sensors in a torque sensor group selected after synchronization states of the torque sensors are determined to be a normal state by the first synchronization checker, and
all synchronization states of one or more torque sensors included in the selected torque sensor group are determined to be the normal state.

5. The apparatus of claim 1, wherein each of the torque sensors includes:
an A sensor configured to sense an amount of rotation of the steering IS; and
a B sensor configured to sense an amount of rotation of the steering OS, and
the first synchronization checker determines that an $i^{th}$ torque sensor (I=1, 2, 3, and 4) and a $j^{th}$ torque sensor (j=1, 2, 3, and 4; i≠j) are synchronized only when a difference between an output value of an A or B sensor of the $i^{th}$ torque sensor (i=1, 2, 3, and 4) and an output value of an A or B sensor of the $j^{th}$ torque sensor (j=1, 2, 3, and 4; i≠j) is less than or equal to a threshold value.

6. The apparatus of claim 5, wherein the first synchronization checker compares relative rotation angle information, which is determined to be a differential value between an output value of an A sensor and an output value of a B sensor, of two or more synchronized torque sensors determined by comparing an output value of an A sensor and an output value of a B sensor, and determines a torque sensor outputting different relative rotation angle information to be in a failure state.

7. The apparatus of claim 5, wherein the torque calculator determines a differential value between an output value of the A sensor and an output value of the B sensor of each of two or more synchronized torque sensors determined by the first synchronization checker as a relative rotation angle of the corresponding torque sensor, and calculates the torque value based on an average value of relative rotation angle information of the two or more torque sensors.

8. The apparatus of claim 1, wherein the first synchronization checker compares relative rotation angle information output from the first to fourth torque sensors and determines a torque sensor outputting different relative rotation angle information to be in a failure state.

9. The apparatus of claim 8, wherein the torque calculator calculates the torque value from an average value of output values of two torque sensors having preset high priority orders among torque sensors in a normal state when two or more torque sensors are determined to be in the normal state, and calculates the torque value based on an output value of one torque sensor in the normal state when three torque sensors are determined to be in the failure state.

10. The apparatus of claim 9, wherein the steering angle calculator calculates the steering angle based on an output value of one rotation angle sensor having a highest priority order among synchronized rotation angle sensors and the average value of the output values of the two torque sensors of the normal state having the preset high priority orders or the output value of the single torque sensor in the normal state.

11. The apparatus of claim 8, wherein the torque calculator calculates the torque value from an average value of output values of one or more torque sensors determined to be in a normal state.

12. The apparatus of claim 1, further comprising:
rotation members fixed at one end of the steering IS and one end of the steering OS and configured to rotate with the steering IS and OS;
interference members formed to protrude from circumferential surfaces of the steering IS and OS; and
an offset sensor installed on at least one of the rotation members and configured to sense movement of the interference members.

13. The apparatus of claim 12, wherein the offset sensor is a photointerrupter generating output signals which are variable according to relative movement of the interference members, and senses deviation of the rotation members from initial installation positions at the steering IS and OS.

14. An apparatus for detecting steering information, the apparatus comprising:
a torque sensor configured to sense a relative rotation angle according to distortion of a torsion bar disposed between a steering input shaft (IS) and a steering output shaft (OS);
an offset sensing device including an interference member configured to radially protrude from a circumferential surface of the steering IS or OS, and an offset sensor installed on a rotation member fixed at one end of the steering IS or OS and configured to generate an output signal according to movement relative to the interference member; and
a torque calculator configured to calculate a torque applied to the torsion bar from the relative rotation angle output from the torque sensor.

15. The apparatus of claim 14, wherein the offset sensor is a photointerrupter generating output signals which are variable according to the relative movement of the interference member, and
the offset sensing device senses deviation of the rotation member from an initial installation position at the steering IS or OS.

16. A method of detecting steering information, the method comprising:
outputting, by first to fourth torque sensors, relative rotation angle information according to distortion of a torsion bar disposed between a steering input shaft (IS) and a steering output shaft (OS);
outputting, by first to fourth rotation angle sensors, absolute rotation angle information of the steering IS or OS;
checking synchronization states of output values of the four torque sensors;

checking synchronization states of output values of the four rotation angle sensors;

calculating a torque value based on at least one of the output values of the four torque sensors according to results of the first synchronization checking operation; and calculating a steering angle based on at least one of the output values of the four torque sensors and at least one of the output values of the four rotation angle sensors according to results of the first and second synchronization checking operations.

17. The method of claim 16, further comprising sensing deviation of a rotation member from an initial installation position at the steering IS or OS by using an offset sensing device including an interference member radially protruding from a circumferential surface of the steering IS or OS and an offset sensor installed on the rotation member fixed at one end of the steering IS or OS and generating an output signal according to movement relative to the interference member.

\* \* \* \* \*